United States Patent
Yu et al.

(10) Patent No.: US 11,777,828 B2
(45) Date of Patent: Oct. 3, 2023

(54) SELF-DEFINABLE COUNTER-BASED FILTERING METHOD AND DEVICE, AND COMPUTER READABLE STORAGE MEDIUM

(71) Applicant: ZTE Corporation, Shenzhen (CN)

(72) Inventors: Dunfu Yu, Shenzhen (CN); Zhengbin Liang, Shenzhen (CN); Yang Yang, Shenzhen (CN); Jianwei Qu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/629,140

(22) PCT Filed: Jun. 4, 2020

(86) PCT No.: PCT/CN2020/094425
§ 371 (c)(1),
(2) Date: Jan. 21, 2022

(87) PCT Pub. No.: WO2021/012817
PCT Pub. Date: Jan. 28, 2021

(65) Prior Publication Data
US 2022/0294713 A1 Sep. 15, 2022

(30) Foreign Application Priority Data
Jul. 24, 2019 (CN) .......................... 201910673726.4

(51) Int. Cl.
| | |
|---|---|
| *H04L 43/10* | (2022.01) |
| *H04L 43/028* | (2022.01) |
| *H04W 4/70* | (2018.01) |
| *H04W 4/38* | (2018.01) |
| *H04W 12/084* | (2021.01) |

(52) U.S. Cl.
CPC ............ *H04L 43/10* (2013.01); *H04L 43/028* (2013.01); *H04W 4/38* (2018.02); *H04W 4/70* (2018.02); *H04W 12/084* (2021.01)

(58) Field of Classification Search
CPC ... H04L 43/10; H04L 63/102; H04L 63/0245; H04L 67/61; H04L 63/20; H04L 67/025;
(Continued)

(56) References Cited

U.S. PATENT DOCUMENTS

| | | |
|---|---|---|
| 2005/0101306 A1 | 5/2005 | Zabawskyj et al. |
| 2012/0011080 A1 | 1/2012 | Smith et al. |

(Continued)

FOREIGN PATENT DOCUMENTS

| | | |
|---|---|---|
| CN | 101944209 A | 1/2011 |
| CN | 102436503 A | 5/2012 |

(Continued)

OTHER PUBLICATIONS

International Searching Authority, International Search Report and Written Opinion for PCT Application No. PCT/CN2020/094425 and English translation, dated Sep. 3, 2020, pp. 1-10.

(Continued)

*Primary Examiner* — Kyung H Shin
(74) *Attorney, Agent, or Firm* — Vivacqua Crane, PLLC

(57) ABSTRACT

A customizable filtering method for a counter, apparatus, and a computer storage medium are disclosed. The method may include: configuring a first filter condition according to a filter parameter table, at least one category of first filter parameters being configured in the first filter condition (S101); converting the first filter parameters into second filter parameters by means of category uniformization (S102); analyzing a second filter condition according to the filter parameter table, converting the second filter condition into a first data structure that facilitates local filter process-
(Continued)

ing and saving the first data structure (S103); collecting performance data, the performance data comprising filter indication information (S104); processing the filter indication information according to the filter parameter table, and storing the filter indication information in a second data structure (S105); and performing filter processing on the filter indication information stored in the second data structure, and recording the filter result (S106).

9 Claims, 5 Drawing Sheets

(58) Field of Classification Search
CPC .......................... H04L 67/125; H04W 12/084; H04W 12/082; H04W 4/38; H04W 4/70; H04W 4/44; G07C 5/008; G07C 5/085; B60R 16/0232
See application file for complete search history.

(56) References Cited

U.S. PATENT DOCUMENTS

| | | | |
|---|---|---|---|
| 2015/0215186 A1* | 7/2015 | Alonso Franco | ....... H04L 43/10 709/224 |
| 2016/0142269 A1 | 5/2016 | Konduru et al. | |
| 2018/0136994 A1 | 5/2018 | Toledano | |
| 2018/0152360 A1 | 5/2018 | Norum | |
| 2018/0293809 A1* | 10/2018 | James | ..................... H04W 4/38 |
| 2019/0034487 A1 | 1/2019 | Balachandran et al. | |

FOREIGN PATENT DOCUMENTS

| | | | |
|---|---|---|---|
| CN | 105471671 A | * | 4/2016 |
| CN | 105471671 A | | 4/2016 |
| CN | 107391532 A | | 11/2017 |

OTHER PUBLICATIONS

European Patent Office. Extended European Search Report for EP Application No. 20843583.4, dated Jul. 1, 2022, pp. 1-8.
The State Intellectual Property Office of People's Republic of China. First Office Action for CN Application No. 2019106737264 and English translation, dated Nov. 4, 2022, pp. 1-8.
The State Intellectual Property Office of People's Republic of China. First Search Report for CN Application No. 2019106737264 and English translation, dated Oct. 29, 2022, pp. 1-4.

* cited by examiner

SELF-DEFINABLE COUNTER-BASED FILTERING METHOD AND DEVICE, AND COMPUTER READABLE STORAGE MEDIUM

CROSS-REFERENCE TO RELATED APPLICATION

This application is a national stage filing under 35 U.S.C. § 371 of international application number PCT/CN2020/094425, filed on Jun. 4, 2020, which claims priority to Chinese patent application No. 201910673726.4 filed on Jul. 24, 2019. The contents of these applications are incorporated herein by reference in their entirety.

TECHNICAL FIELD

Embodiments of the present disclosure relate to, but are not limited to, the field of communications technologies, and in particular relate to, but are not limited to, a customizable filtering method and apparatus for a counter, and a non-transitory computer-readable storage medium.

BACKGROUND

Performance data collection is a basic function of a modern communications system. In the communications system, collected performance data is usually presented to users through counters. Traditional counters are already provided with conditions when implemented, and the users cannot configure the conditions otherwise by themselves.

In addition, the great number of traditional counters cause difficulties in development and maintenance and cause inconvenience to use, although many related counters have only different conditions but other attributes of the counters are all the same. With the development of science and technology, new requirements of performance data reporting are imposed for the communications system. Therefore, it is important to propose a new technical scheme to solve the problem in the existing technology.

SUMMARY

Embodiments of the present disclosure provide a customizable filtering method and apparatus for a counter, to solve at least to a certain extent, a problem in the existing technology that filter conditions cannot be customized in a counter.

In view of this, an embodiment of the present disclosure provides a customizable filtering method for a counter, which may include: configuring a first filter condition according to a loaded filter parameter table, where the first filter condition includes at least one type of first filter parameters and logical operations; processing the first filter parameter into a second filter parameter through type unification, and correspondingly, converting the first filter condition into a second filter condition; analyzing, according to the filter parameter table, a configuration of the second filter condition, and converting and storing the second filter condition as a first data structure that is easy to filter locally; collecting performance data, where the performance data includes basic performance information and filter indication information; processing the filter indication information according to the filter parameter table, and storing the filter indication information into a second data structure; and performing filtering on the filter indication information stored in the second data structure according to the second filter condition in the first data structure, and recording a filtering result.

An embodiment of the present disclosure further provides a customizable filtering apparatus for a counter, which may include a filter setting module, a type unification module, a filtering execution module, and a performance collection module. The filter setting module is configured to: load a filter parameter table, send all or a part of content of the filter parameter table to the filtering execution module, and configure a first filter condition and send the first filter condition to the type unification module, where the first filter condition includes at least one filter parameter. The type unification module is configured to perform type unification on the filter parameter, and convert the first filter condition into a second filter condition and send the second filter condition to the filtering execution module in a self-explanatory form. The filtering execution module is configured to: load the received filter parameter table, analyze, according to the filter parameter table, a configuration of the second filter condition, and convert and store the second filter condition as a first data structure that is easy to filter locally. The performance collection module is configured to collect performance data and send the performance data to the filtering execution module, where the performance data includes basic performance information and filter indication information. The filtering execution module is further configured to: process the filter indication information according to the filter parameter table, store the filter indication information into a second data structure, perform filtering on the second data structure according to the second filter condition in the first data structure, and send a filtering result and the received basic performance information to a subsequent processing module.

An embodiment of the present disclosure further provides a non-transitory computer-readable storage medium storing one or more programs executable by one or more processors to implement the steps of the customizable filtering method for a counter as described above.

Other features and corresponding beneficial effects of the present disclosure are explained in the subsequent description, and it should be understood that at least some of the beneficial effects become apparent from the description of the present disclosure.

DETAILED DESCRIPTION

In order to make the objective, technical schemes and advantages of the present disclosure clear to be understood, the implementations of the present disclosure will be further illustrated in detail by means of the embodiments in conjunction with the accompanying drawings. It should be understood that the embodiments described here are intended only to explain the present disclosure and are not intended to limit the present disclosure.

Example Embodiment I

In order to solve a problem in the existing technology that filter conditions cannot be customized in a counter, this embodiment of the present disclosure provides a customizable filtering method for a counter, which enables the counter to support customized setting of the filter condition. In addition, the number of data types to be filtered is reduced through type unification on filter parameters, and some data structures that are not easy to filter can be easily filtered.

Figure 1:
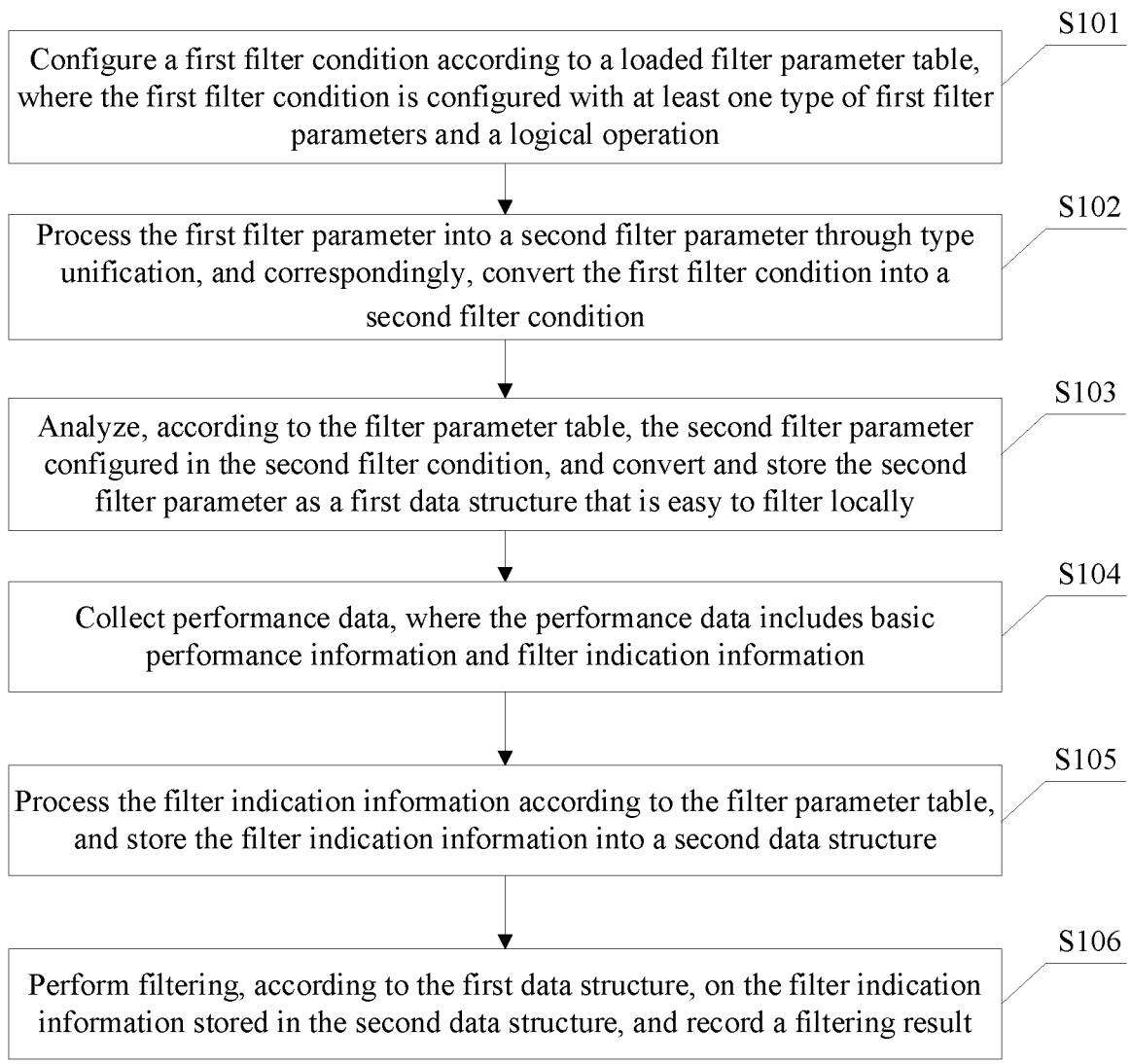
FIG. 1 is a flowchart of a customizable filtering method for a counter according to example embodiment I of the present disclosure.

FIG. 1 is a basic flowchart of a customizable filtering method for a counter according to an embodiment of the present disclosure. The method is as follows.

At S101, a first filter condition is configured according to a loaded filter parameter table, where the first filter condition is configured with at least one type of first filter parameters.

In the embodiment of the present disclosure, the filter parameter table is loaded through a filter setting module, and the filter parameter table includes information about all types of filter parameters supported by a current communication system. After loading the filter parameter table, the filter setting module configures the first filter condition, where filter parameters in the first filter condition come from the filter parameter table.

In the embodiment of the present disclosure, the first filter condition is a condition set by a user to control whether the counter should perform reporting, that is, data that meets the condition is filtered and reported. A purpose of control is to make the user pay attention only to the counter under the set first filter condition. It should be noted that the first filter condition is generally given in a form of a certain parameter or several parameters within a specific range, and often includes a logical operation. For example, QCI is greater than 1, and PLMN ID is equal to 46001 and QCI is between 1 and 5. The former condition includes no logical operation, and the latter condition includes an AND operation.

In the embodiment of the present disclosure, the filter parameter is a parameter with a limited range in the first filter condition. For example, the first filter condition: PLMN ID is equal to 46001 and QCI is between 1 and 5, includes two parameters with a limited range, the PLMN ID and the QCI. In other words, this first filter condition includes two filter parameters.

It should be understood that the filter condition is configured with at least one type of filter parameters, and each type of filter parameters at least includes name information, description information, a coded value, an original data type, a range, a unified target type, a conversion indication, and the like. Here, only the conversion indication can be blank, and the others cannot be blank. The name information, the description information, and the coded value cannot be duplicated. Each type of filter parameters has its unique type identification information to distinguish it from other types of filter parameters. The type identification information can be name information, description information, a coded value, and the like.

The first filter condition can be a sub-filter condition or a filter condition combination. Here, the sub-filter condition is the first filter condition that includes only one type of filter parameters. For example, "QCI is greater than 1" is a sub-filter condition, while "PLMN ID is equal to 46001 and QCI is between 1 and 5" includes two types of filter parameters and is not a sub-filter condition. In addition, the sub-filter condition may include a NOT operation. For example, "other than QCI greater than 1" is equivalent to a NOT operation on "QCI is greater than 1". The filter condition combination may be the first filter condition including one sub-filter condition, or the first filter condition connected by multiple sub-filter conditions through logical AND operations and/or logical OR operations.

It should be noted that all sub-filter conditions are filter condition combinations, and the sub-filter conditions are special cases of filter condition combinations.

In the embodiment of the present disclosure, a name of the filter condition combination can be customized, the filter parameters can be selected, a range can be set for each selected type of filter parameters, and whether the sub-filter condition includes a NOT operation can be set. When one filter condition combination includes at least two sub-filter conditions, logical operations between the sub-filter conditions and a processing order of the sub-filter conditions can also be customized. In the embodiment of the present disclosure, multiple filter condition combinations may be set at one time.

In the embodiment of the present disclosure, the logical operations between the sub-filter conditions can be all AND operations, all OR operations or user-defined operations, that is, the user can flexibly select the operations. When "all AND operations" is selected, it means that an operation between any two adjacent sub-conditions is the AND operation. When "all OR operations" is selected, it means that the operation between any two adjacent sub-conditions is the OR operation. When "user-defined" is selected, the user can choose "logical AND" or "logical OR" for the operation between any two adjacent sub-conditions. The configured first filter condition is described in natural language in the following.

Filter Condition Combination 1:

Sub-filter condition 1: Cell Id is within an interval [0, 10], and there is no NOT operation.

Sub-filter condition 2: RSRP is within an interval [−156,−90], and there is no NOT operation.

The logical operation between the sub-filter conditions: AND operation.

Filter Condition Combination 2:

Sub-filter condition 1: Cell Id is within an interval [0, 10], and there is no NOT operation.

Sub-filter condition 2: Cell Transmit Power is within an interval [0, 0.01], and there is no NOT operation.

The logical operation between the sub-filter conditions: AND operation.

At S102, the first filter parameter is processed into a second filter parameter through type unification, and correspondingly, the first filter condition is converted into a second filter condition.

In the embodiment of the present disclosure, after configuring the first filter condition, the filter setting module sends the first filter condition to a type unification module for type unification. In this way, the number of data types to be filtered can be reduced, and some data structures that are not easy to filter can be easily filtered. The first filter parameter and the second filter parameter are used to distinguish filter parameters before and after type unification processing. The first filter condition is configured with at least one type of first filter parameters. After type unification processing, the first filter condition is correspondingly converted into the second filter condition, that is, the second filter condition is configured with at least one type of second filter parameters.

It should be understood that types of data structures include but are not limited to, basic data types, structure types, and the like. The basic data types include integer types (byte, short, int, long), floating-point types (float, double), character types (char), Boolean types, and the like. Some types of data structures are not easy to filter, for example, the structure type. Some data types are inefficient for direct filtering, for example, the structure type and the floating-point data type. Therefore, a purpose of type unification is to convert many data types into a limited number of data types, so as to facilitate filtering. In the embodiment of the present disclosure, a unified target type is an unsigned integer type.

It should be noted that if an original data type of the filter parameter originally belongs to the unified target type, there is no need to perform type unification. Otherwise, conversion is performed according to a type unification rule. The type unification rule can include at least one of the following.

(1) A Structure Merging Rule:

If a value of a filter parameter is of a structure type, and all valid fields in the structure can be merged into a value of a basic type, the structure type can be directly converted by merging. A merging algorithm may be different depending on different types of filter parameters.

For example, in a simple merging algorithm, other members than a certain member are simply shifted to the left by several binary bits respectively. Then, an obtained value is added to the member that has not shifted to the left, and an obtained sum is used as a merged value. For example, if there are four BYTE members a, b, c and d in a certain structure type, a, b and c are shifted to the left by 24, 16 and 8 binary bits respectively. Then, an obtained value is added to d to get a value of a WORD32 type, which is used as a merged value. For example, if a=0x12, b=0x34, c=0x56, and d=0x78, a merged value of the WORD32 type is 0x12345678.

(2) A Floating-Point Type Conversion Rule:

If a value of a filter parameter is of a floating-point type, and a range is all within a range of an unsigned integer after being increased by certain times, the floating-point type can be converted into an unsigned integer by increasing by times.

(3) A Negative Integer Conversion Rule:

If a value of a filter parameter is of a certain signed integer type and may actually be a negative value, and a range is all within a range of a certain unsigned integer type after adding the certain value, the signed integer type can be converted into the unsigned integer type by adding the value.

(4) A Mapping Rule:

Any type that cannot be converted to one of the unsigned integer types at one or more times by adopting the former three rules is mapped to a certain unsigned integer type by a certain mapping algorithm. A mapping algorithm may be different depending on different types of filter parameters.

It should be noted that if the filter parameters are configured to the device by device management software, and both the device and the device management software have parameter values and corresponding configuration indexes, the configuration indexes can be used to replace the filter parameters for filtering.

In the embodiment of the present disclosure, after the first filter parameter is converted into the second filter parameter through type unification, a value and a value range of the first filter parameter are also replaced by a value and a value range of the converted second filter parameter for subsequent filtering.

It should be noted that after type unification, the type unification module sends the second filter condition to a filtering execution module in a self-explanatory form, which can reduce coupling between the modules. Implementations of self-explanation include but are not limited to JavaScript object notation (JSON), Extensible Markup Language (XML), Tag-Length-Value (TLV) coding, Tag-Value (TV) coding, and the like.

At S103, the second filter parameter configured in the second filter condition is analyzed according to the filter parameter table, and the second filter parameter is converted and stored as a first data structure that is easy to filter locally.

In the embodiment of the present disclosure, the second filter condition is in a self-explanatory form, which may be different from a form of a local data structure of the filtering execution module. Therefore, it is necessary to convert and store the second filter condition as the first data structure that is easy to filter locally, where the first data structure may be FilterConfig.

At S104, performance data is collected, where the performance data at least includes basic performance information and filter indication information.

In the embodiment of the present disclosure, performance data collection is implemented by a performance collection module, which sends the collected performance data to the filtering execution module. It should be understood that the performance data at least includes the basic performance information and the filter indication information, and the basic performance information mainly includes information for obtaining counter numbers and values, and the like. The filter indication information exists in a self-explanatory form, to reduce coupling between a sender and a receiver.

Forms of the filter indication information include but are not limited to JSON, XML, TLV coding, TV coding, and the like. The TV coding form is further described in detail in a form of the filter indication information as follows:

A tag part is a coded value of the filter parameter, which occupies a fixed length of bytes. A specific length is determined according to needs. A value part is a specific value of the filter parameter. For example, when a Tag length is 1 byte, a TV-coded stream with a total length of 5 bytes in the filter indication information including the Cell Id and the RSRP is 0x00, 0x00, 0x0a, 0x01, 0x01 and 0x01.

At S105, the filter indication information is processed according to the filter parameter table, and is stored into a second data structure.

In the embodiment of the present disclosure, because the filter parameter table is sensitive to performance, the filtering execution module stores the filter indication information into the second data structure, which can be a random access data structure FilterIndication of O(1) complexity. One form of this data structure is an array with the coded value (Tag value) of the filter parameter as a subscript, and each element in the array can at least store the value of the filter parameter.

At S106, filtering is performed, according to the first data structure, on the filter indication information stored in the second data structure, and a filtering result is recorded.

In the embodiment of the present disclosure, the filter indication information is an object on which filtering is to be performed, and the first data structure is a locally stored data structure converted from the second filter parameter configured in the second filter condition, and is the basis of filtering.

Figure 2:
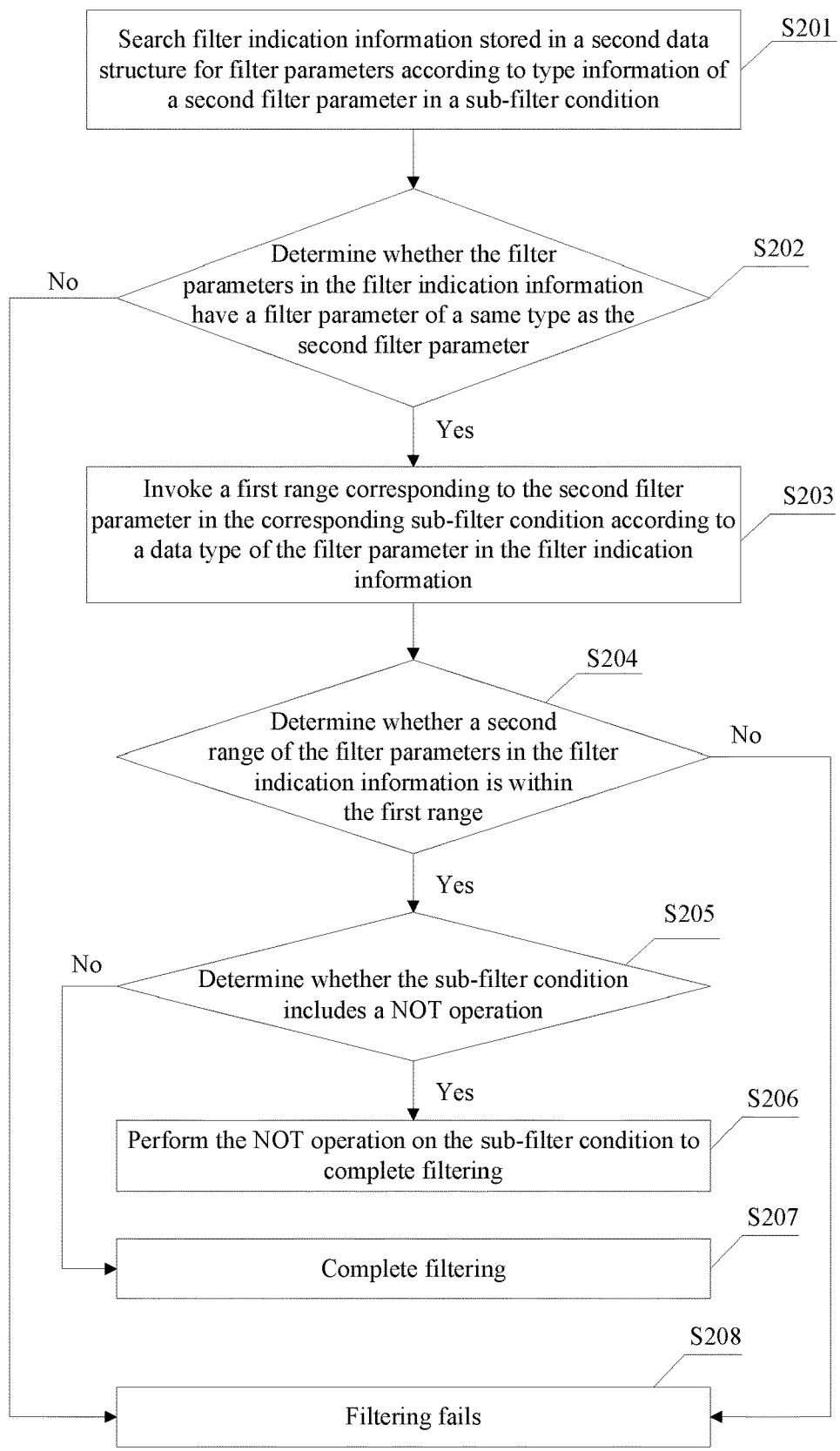
FIG. 2 is a flowchart of filtering in a customizable filtering method for a counter of example embodiment I of the present disclosure.

It should be noted that, when the filter condition is a filter condition combination, the filtering method is to perform cyclic filtering on the filter indication information by adopting each sub-filter condition in the filter condition combination. As shown in FIG. 2, a specific procedure is as follows.

At S201, the filter indication information stored in the second data structure is searched for the filter parameters according to type information of the second filter parameter in the sub-filter condition.

At S202, whether the filter parameters in the filter indication information have a filter parameter of a same type as the second filter parameter is determined. If the filter parameters in the filter indication information have a filter parameter of a same type as the second filter parameter, S203 is performed; if the filter parameters in the filter indication information do not have a filter parameter of a same type as the second filter parameter, S208 is performed.

At S203, a first range corresponding to the second filter parameter in the corresponding sub-filter condition is invoked according to a data type of the filter parameter in the filter indication information.

At S204, whether a second range of the filter parameters in the filter indication information is within the first range is determined. If the second range of the filter parameters in the filter indication information is within the first range, S205 is performed; if the second range of the filter parameters in the filter indication information is not within the first range, S208 is performed.

At S205, whether the sub-filter condition has the NOT operation is determined. If the sub-filter condition has the NOT operation, S206 is performed; if the sub-filter condition has no NOT operation, S207 is performed.

At S206, the NOT operation is performed on the sub-filter condition to complete filtering.

At S207, filtering is completed.

At S208, filtering fails.

It should be noted that, when the condition combination includes at least two sub-filter conditions, there is a set of corresponding processing procedures for any one of operations between the sub-filter conditions, that is, all AND operations, all OR operations or user-defined operations. Here, when operations between the sub-filter conditions are "all AND operations" or "all OR operations", a short-circuit operation can be used to improve processing efficiency. For example, when the operations between the sub-filter conditions are "all AND operations", if the filter parameter in the filter indication information does not meet the first sub-filter condition of the filter condition combination, it can be determined that the filter parameter does not meet the entire filter condition combination, and then the operation is stopped. When the operations between the sub-filter conditions are "all OR operations", when the filter parameter in the filter indication information meets the first sub-filter condition of the filter condition combination, it can be determined that the filter parameter meets the entire filter condition combination, and then the operation is stopped. This manner obviously improves filtering efficiency.

In some application scenarios of the embodiment of the present disclosure, at least two filter condition combinations may be set at one time. In this case, the filtering process further includes performing cyclic filtering on the filter indication information by adopting each filter condition combination in the first data structure.

In an embodiment of the present disclosure, filtering is performed, according to the first data structure, on the filter indication information stored in the second data structure, and a filtering result is recorded. Then, the filtering result and the received basic performance information sent by the performance collection module are sent to a subsequent processing module.

It should be understood that the filtering result should be provided in a form required by the subsequent processing module. The form indicates that only identification information of those filter condition combinations that pass filtering is included. In some application scenarios of the embodiment of the present disclosure, a specific form is as follows, but it is not limited to this form:

{"FilterPassedConditionName":["condition combination 1"]}.

In the customizable filtering method for a counter provided by the embodiment of the present disclosure, the first filter condition is configured according to the filter parameter table, where the first filter condition is configured with at least one type of first filter parameters. The first filter parameter is converted into the second filter parameter through type unification. The second filter parameter configured in the second filter condition is analyzed according to the filter parameter table, and the second filter parameter is converted and stored as the first data structure that is easy to filter locally. Performance data is collected, where the performance data at least includes basic performance information and filter indication information. The filter indication information is processed according to the filter parameter table, and stored into the second data structure. Filtering is performed, according to the first data structure, on the filter indication information stored in the second data structure, and a filtering result is recorded. In some implementations, customized setting of the filter conditions for the counter can be implemented, a filtering function is universal and can reduce the number of data types to be filtered, and filtering of filter parameters of multiple data types is supported.

Example Embodiment II

As described above, the types of the data structures in the embodiment of the present disclosure include but are not limited basic data types, structure types, and the like. For convenience of understanding, the following provides an example to illustrate that the counter can support filtering for basic data types.

It is assumed that there are three types of filter parameters supported by a current communications system. For relevant information, refer to Table 1.

TABLE 1

| Name information | Description information | Coded value | Original data type | Range | Unified target type | Conversion indication |
|---|---|---|---|---|---|---|
| Cell Id | ID of a logical cell in a station | 0 | WORD16 | [0, 65535] | WORD16 | |

TABLE 1-continued

| Name information | Description information | Coded value | Original data type | Range | Unified target type | Conversion indication |
|---|---|---|---|---|---|---|
| RSRP | Reference signal received power | 1 | SBYTE | [−156, −29] | BYTE | basic:V + 156 |
| Cell Transmit Power | Cell transmit power | 2 | FLOAT | [0, 2.123], with up to 3 digits after the decimal point | WORD16 | basic:V*1000 |

It should be noted that the data types: SBYTE, BYTE, WORD16, and FLOAT in Table 1 are equivalent to types: signed char, unsigned char, unsigned short, and float respectively. The range is given in a form of an interval. It should be understood that a range of some parameters is only used to illustrate the problem, and may not be consistent with a real situation.

In the embodiment of the present disclosure, an original data type of the filter parameter is the basic data type. It should be understood that the basic data type is a data type that can be processed by any hardware.

Figure 3:
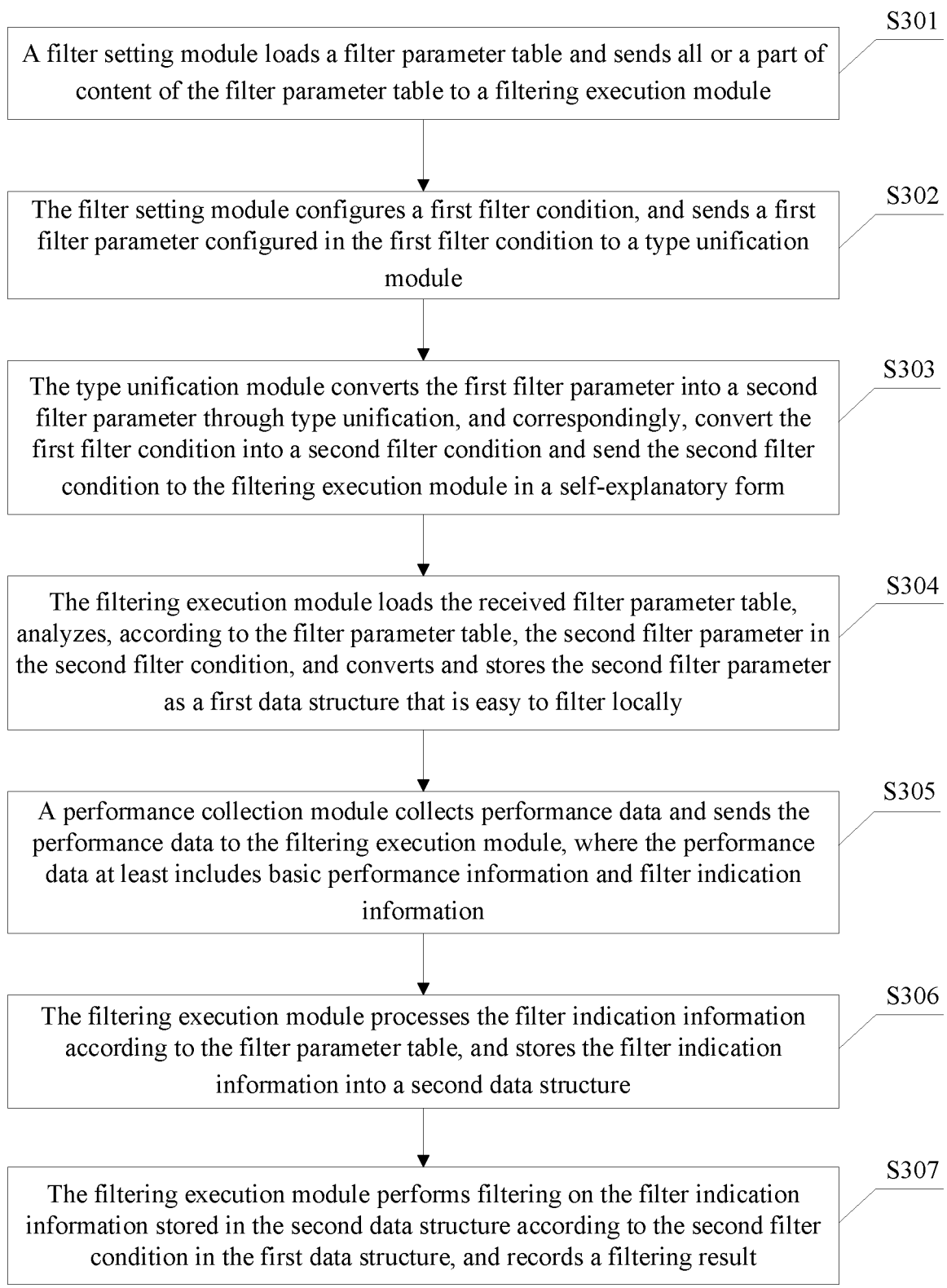
FIG. 3 is a flowchart of a customizable filtering method for a counter according to example embodiment II of the present disclosure.

FIG. 3 is a flowchart of supporting customizable filtering by basic data types by a counter according to an embodiment of the present disclosure. The specific method is as follows:

At S301, a filter setting module loads a filter parameter table and sends all or a part of content of the filter parameter table to a filtering execution module.

In the embodiment of the present disclosure, the content of the filter parameter table comes from Table 1, that is, the filter parameter table includes information about all types of filter parameters supported by the current communications system. The filter parameter table may be but not limited to the form of Table 1, and other self-explanatory forms such as XML, and JSON may alternatively be used.

At S302, the filter setting module configures a first filter condition, and sends a first filter parameter configured in the first filter condition to a type unification module.

In the embodiment of the present disclosure, each filter parameter in the first filter condition comes from the filter parameter table. Other content is the same as the above-mentioned embodiment, and details are not described herein again.

At S303, the type unification module converts the first filter parameter into a second filter parameter through type unification, and correspondingly, convert the first filter condition into a second filter condition and send the second filter condition to the filtering execution module in a self-explanatory form.

In the embodiment of the present disclosure, two configured first filter conditions are as follows.

Filter Condition Combination 1:
Sub-filter condition 1: Cell Id is within an interval [0, 10], and there is no NOT operation.
Sub-filter condition 2: RSRP is within an interval [−156,−90], and there is no NOT operation.
The logical operation between the sub-filter conditions: AND operation.

Filter Condition Combination 2:
Sub-filter condition 1: Cell Id is within an interval [0, 10], and there is no NOT operation.
Sub-filter condition 2: Cell Transmit Power is within an interval [0, 0.01], and there is no NOT operation.
The logical operation between the sub-filter conditions: AND operation.

A process of performing type unification on the foregoing two filter condition combinations is as follows.

An original data type of Cell Id is consistent with a unified target type, so unification is not necessary. The RSRP is unified according to the conversion indication basic: V+156, where basic means that data types before and after unification are basic data types, and the formula V+156 means adding 156 to a value before conversion to get a new value. After unification, the range [−156,−90] set by a user is converted into [0,66]. Cell Transmit Power is unified according to the conversion indication BASIC: V*1000, and the range [0, 0.01] set by the user is converted to [0,10] after unification.

After type unification is completed, data is sent to the filtering execution module in a self-explanatory form. This can reduce coupling between the modules. The implementation of self-explanation includes but is not limited to forms of JSON, XML, TLV coding and TV coding.

It should be understood that, no matter data is sent in any one of the foregoing forms, the following information should be included in the data: a name of a filter condition combination (for example, "filter condition combination 1"), a name of a filter parameter (for example, "sub-filter condition 1") of each sub-filter condition in each filter condition combination, a value range of the filter parameter, information indicating whether the sub-filter condition includes a NOT operation, a logical operation between any two adjacent sub-filter conditions, and the like. It should be noted that the value range of the filter parameter should be a range after type unification.

At S304, the filtering execution module loads the received filter parameter table, analyzes, according to the filter parameter table, the second filter parameter in the second filter condition, and converts and stores the second filter parameter as a first data structure that is easy to filter locally.

In the embodiment of the present disclosure, data in the second filter condition received by the filtering execution module from the type unification module is in a self-explanatory form, which may be different from a form of a local data structure of the filtering execution module. Therefore, it is necessary to convert and store the data in the second filter condition as the first data structure that is easy to filter locally, where the first data structure may be FilterConfig.

At S305, a performance collection module collects performance data and sends the performance data to the filtering execution module, where the performance data at least includes basic performance information and filter indication information.

In the embodiment of the present disclosure, performance data collection is implemented by the performance collection module, which sends the collected performance data to the filtering execution module. It should be understood that the performance data at least includes the basic performance information and the filter indication information, and the basic performance information mainly includes information for obtaining counter numbers and values, and the like. The filter indication information exists in a self-explanatory form, to reduce coupling between a sender and a receiver.

Forms of the filter indication information include but are not limited to JSON, XML, TLV coding, TV coding, and the like. The TV coding form is further described in detail in a form of the filter indication information as follows:

A tag part is a coded value of the filter parameter, which occupies a fixed length of bytes. A specific length is determined according to needs. A value part is a specific value of the filter parameter. For example, when a Tag length is 1 byte, a TV-coded stream with a total length of 5 bytes in the filter indication information including the Cell Id and the RSRP is 0x00, 0x00, 0x0a, 0x01, 0x01 and 0x01.

At S306, the filtering execution module processes the filter indication information according to the filter parameter table, and stores the filter indication information into a second data structure.

In the embodiment of the present disclosure, because the filter parameter table is sensitive to performance, the filtering execution module stores the filter indication information into the second data structure, which can be a random access data structure FilterIndication of O(1) complexity. One form of this data structure is an array with the coded value (Tag value) of the filter parameter as a subscript, and each element in the array can at least store the value of the filter parameter.

At S307, the filtering execution module performs filtering on the filter indication information stored in the second data structure according to the second filter condition in the first data structure, and records a filtering result.

In the embodiment of the present disclosure, the filter indication information is an object on which filtering is to be performed, and the first data structure is a locally stored data structure converted from the second filter parameter configured in the second filter condition, and is the basis of filtering.

It should be noted that, when the filter condition is a filter condition combination, the filtering method is to perform cyclic filtering on the filter indication information by adopting each sub-filter condition in the filter condition combination. A specific filtering process has been described in detail in the foregoing embodiment, and details are not repeated herein.

In some application scenarios of the embodiment of the present disclosure, at least two filter condition combinations may be set at one time. In this case, the filtering process further includes performing cyclic filtering on the filter indication information by adopting each filter condition combination in the first data structure.

In the embodiment of the present disclosure, filtering is performed, according to the first data structure, on the filter indication information stored in the second data structure, and a filtering result is recorded. Then, the filtering result and the received basic performance information sent by the performance collection module are sent to a subsequent processing module.

It should be understood that the filtering result should be provided in a form required by the subsequent processing module. The form indicates that only identification information of those filter condition combinations that pass filtering is included. In some application scenarios of the embodiment of the present disclosure, a specific form is as follows, but it is not limited to this form:

{"FilterPassedConditionName":["condition combination 1"]}.

In the customizable filtering method according to basic data types for a counter provided by the embodiment of the present disclosure, the first filter condition is configured according to the filter parameter table, where the first filter condition is configured with at least one type of first filter parameters. The first filter parameter is converted into the second filter parameter through type unification. The second filter parameter configured in the second filter condition is analyzed according to the filter parameter table, and the second filter parameter is converted and stored as the first data structure that is easy to filter locally. Performance data is collected, where the performance data at least includes the basic performance information and the filter indication information. The filter indication information is processed according to the filter parameter table, and stored into the second data structure. Filtering is performed, according to the first data structure, on the filter indication information stored in the second data structure, and a filtering result is recorded. In some implementations, type unification is performed on the filter parameter to reduce the number of data types to be filtered. The filter condition is configured in a self-explanatory form and the filter indication information is sent between modules in a self-explanatory form, to minimize coupling between the modules. When reporting the performance data, the performance collection module sends the basic performance data and the filter indication information to the filtering execution module, and the filtering execution module completes general filtering to realize customized setting of the filter conditions for the counter.

Example Embodiment III

On the basis of the foregoing embodiments, the embodiment of the present disclosure provides an example to illustrate that a counter can support filtering of data of structure types.

It is assumed that there are two types of filter parameters supported by a current communications system. For relevant information, refer to Table 2.

TABLE 2

| Name information | Description information | Coded value | Original data type | Range | Unified target type | Conversion indication |
|---|---|---|---|---|---|---|
| Plmn Id | ID of a public land mobile network | 0 | struct | MCC:[0, 999] MNC:[0, 99] or [0, 999] | WORD32 | sturct: SpecificMerge |
| Slice Id | Slice ID | 1 | struct | [0, 9] | BYTE | struct: ConfigIndexReplace |

It should be noted that the data type WORD32 in Table 2 is equivalent to an unsigned int type. struct represents a structure type. Two ranges of MNC are two-bit MNC and three-bit MNC respectively. It should be understood that a range of some parameters is only used to illustrate the problem, and may not be consistent with a real situation.

In the embodiment of the present disclosure, an original data type of a filter parameter is a structure type. It should be understood that implementation steps of the embodiment of the present disclosure are basically the same as those of example embodiment II, and the embodiment of the present disclosure only illustrates the different part.

In an embodiment of the present disclosure, a filter setting module configures a first filter condition, where the first filter condition is configured with a first filter parameter, and each filter parameter comes from a filter parameter table. According to a fact that an original data type of the Plmn ID is struct in Table 2 and a name of the filter parameter, the filter setting module provides an interface to allow a user to input values of MCC and MNC respectively; and provides an interface for the user to set values of members of Slice Id: Plmn Id, SST and SD according to a fact that an original data type of the slice ID is struct.

In the embodiment of the present disclosure, one configured first filter condition is as follows:

Filter Condition Combination 1:

Sub-filter condition 1: In an interval [460, 460], MNC is two bits, and in an interval [1,2], there is no NOT operation in the sub-filter condition.

Sub-filter condition 2: Plmn Id is equal to 46001, SST is equal to 2, SD is equal to 1, and there is no NOT operation in the sub-filter condition.

A logical operation between the sub-filter conditions: OR operation.

It should be understood that the structure type is a data structure that is not easy to filter. After receiving the first filter condition sent by the filter setting module, a type unification module unifies the structure type into a data type that is easy to filter. The type unification module performs special merge processing on the Plmn Id according to a conversion indication struct: SpecificMerge. To be specific, MCC and MNC are merged into a value of the WORD32 type by adopting a structure merging rule. A highest byte of the merged value of the WORD32 type indicates that the number of bits of the Plmn Id is 5 or 6 (corresponding to two or three bits of MNC respectively), and lowest three bytes correspond to a decimal number of MCC followed by MNC. For example, a value of WORD32 after MCC 460 is merged with two-digit MNC 01 is 83932081 (a corresponding hexadecimal value is 0x0500B3B1), and a value of WORD32 after MCC 460 is merged with three-digit MNC 001 is 101123297 (a corresponding hexadecimal value is 0x060704E1). After merging according to the structure merging rule, the range of the configured Plmn Id is changed to [83932081, 83932082]. For Slice Id, configuration data is searched, according to the indication information struct: ConfigIndexReplace, for a slice ID with Plmn Id equal to 46001, SST equal to 2 and SD equal to 1. If such slice ID can be found, a configuration is wrong, and it is required to return to a previous step to reset a value of the slice ID. If such slice ID is found, the configuration data is replaced with a found configuration index.

In the embodiment of the present disclosure, a filtering result should be provided in a form required by a subsequent processing module. The form indicates that only an index of a filter condition combination that passes the filtering is included. In some application scenarios of the embodiment of the present disclosure, a specific form is as follows, but is not limited to this form:

{"FilterPassedConditionIndex": [0]}.

In the customizable filtering method according to structure types for a counter provided by the embodiment of the present disclosure, the first filter condition is configured according to the filter parameter table, where the first filter condition is configured with at least one type of first filter parameters. The first filter parameter is converted into a second filter parameter through type unification. The second filter parameter configured in a second filter condition is analyzed according to the filter parameter table, and the second filter parameter is converted and stored as a first data structure that is easy to filter locally. Performance data is collected, where the performance data at least includes basic performance information and filter indication information. The filter indication information is processed according to the filter parameter table, and stored into a second data structure. Filtering is performed, according to the first data structure, on the filter indication information stored in the second data structure, and a filtering result is recorded. In some implementations, type unification is performed on the filter parameter to reduce the number of data types to be filtered. Further, some data structures that are not easy to filter can be easily filtered. The filter condition is configured in a self-explanatory form and the filter indication information is sent between modules in a self-explanatory form, to minimize coupling between the modules. When reporting the performance data, a performance collection module sends the basic performance data and the filter indication information to a filtering execution module, and the filtering execution module completes general filtering to realize customized setting of the filter conditions for the counter.

Example Embodiment IV

An embodiment of the present disclosure provides a customizable filtering method for a counter, thereby enabling the counter to support filtering by adopting customized filter parameters of both basic data types and structure types.

It should be understood that the embodiment of the present disclosure is a mixed scenario of example embodiment II and example embodiment III, the methods of the two embodiments can be integrated for filtering.

Example Embodiment V

An embodiment of the present disclosure further provides a customizable filtering apparatus for a counter, to implement at least one step of the customizable filtering method for a counter according to the foregoing embodiments. The apparatus includes a filter setting module, a type unification module, a performance collection module, and a filtering execution module.

The filter setting module is configured to: load a filter parameter table, send all or a part of content of the filter parameter table to the filtering execution module, and configure a first filter condition and send the first filter condition to the type unification module, where the first filter condition includes at least one filter parameter.

In the embodiment of the present disclosure, there is only one filter setting module, which is mainly used by a user to configure a filter condition combination. Functions of the filter setting module include loading the filter parameter table, providing an interface for the user to set a name of the filter condition combination, selecting filter parameters, setting a value range of the filter parameter, checking user input, setting that there is a logical NOT operation or there is no NOT operation between sub-filter conditions, adjusting a processing order of multiple sub-filter conditions, setting that a logical operation between adjacent sub-filter conditions is an AND operation or an OR operation, thereby completing setting of one filter condition combination, checking whether multiple filter condition combinations are duplicated, and allowing the user to modify and delete the filter condition combination.

It should be understood that the interface may be a Graphical User Interface (GUI) or a Character User Interface (CUI).

The type unification module is configured to: convert the filter parameter into a second filter parameter through type unification, and correspondingly, convert the first filter condition into a second filter condition and send the second filter condition to the filtering execution module in a self-explanatory form.

In the embodiment of the present disclosure, there is only one type unification module, which is mainly configured to perform type unification on all filter parameters in all filter condition combinations configured by the user, for example, to convert complex data structure types such as structure types into basic data types that are easy to filter, and convert floating-point types and signed integer types into unsigned integer types.

The performance collection module is configured to collect performance data and send the performance data to the filtering execution module, where the performance data at least includes basic performance information and filter indication information.

In the embodiment of the present disclosure, there is at least one performance collection module for collecting performance data, and the specific number of performance collection modules can be set according to an actual need.

The filtering execution module is configured to: load the received filter parameter table, analyze, according to the filter parameter table, the second filter parameter configured in the second filter condition, and convert and store the second filter parameter as a first data structure that is easy to filter locally. The filtering execution module is further configured to: process the filter indication information according to the filter parameter table, store the filter indication information into a second data structure, perform filtering on the second data structure according to the second filter condition in the first data structure, and send a filtering result and the received basic performance information to a subsequent processing module.

In the embodiment of the present disclosure, there is at least one filtering execution module, which is mainly configured to perform filtering according to the filter condition combination configured by the user.

The functions of the filtering execution module include: loading the filter parameter table; converting through configuration and storing the filter condition combination received from the type unification module as the first data structure that is easy to filter locally; receiving the filtering indication information and the basic performance information sent by the performance collection module, analyzing the received filter indication information according to the filter parameter table, and converting and storing the received filter indication information into a second data structure that is easy to filter locally; and implementing a preset filtering algorithm, to perform filtering, according to the second filter condition in the first data structure, the filter indication information stored in the second data structure, and sending a filtering result and the received basic performance information to the subsequent processing module. It should be noted that the subsequent processing module is not a part of this apparatus but a peripheral module of this apparatus.

In some application scenarios of the embodiment of the present disclosure, the filter setting module and the type unification module are disposed in device management software, and the performance collection module and the filtering execution module are disposed in the device. In some application scenarios without device management software or a management device of the embodiment of the present disclosure, the filter setting module, the type unification module, the performance collection module, and the filtering execution module are all disposed in the device. The number and architectures of customizable filtering apparatuses for counters are further described with specific examples below.

Example One

Figure 4:
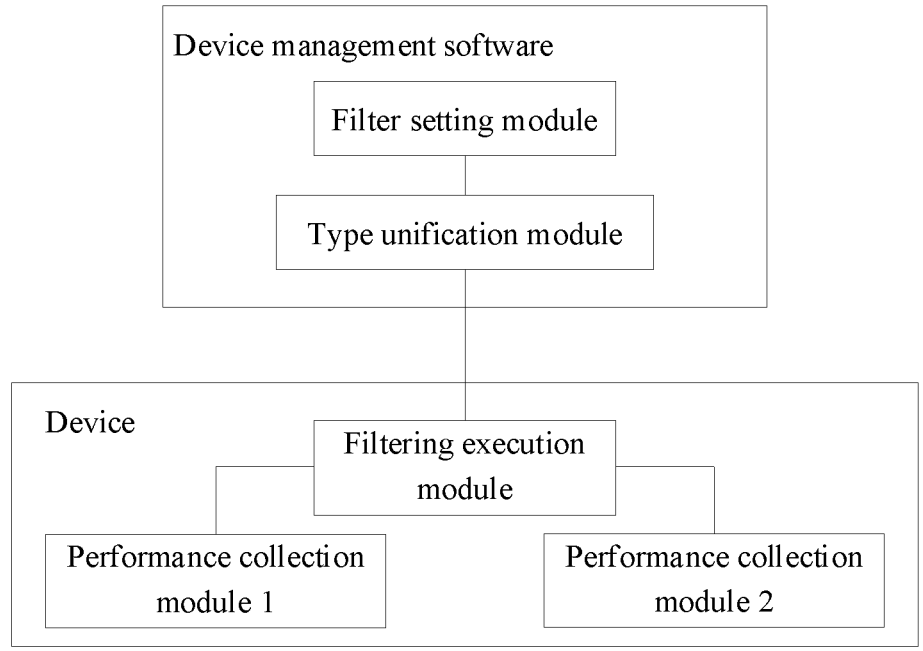
FIG. 4 is a schematic structural diagram of example one of a customizable filtering apparatus for a counter according to example embodiment V of the present disclosure.

Referring to FIG. 4, in this example, one filter setting module and one type unification module are disposed in the device management software. One filtering execution module, and two performance collection modules: a performance collection module 1 and a performance collection module 2 are further disposed in the device.

Example Two

Figure 5:
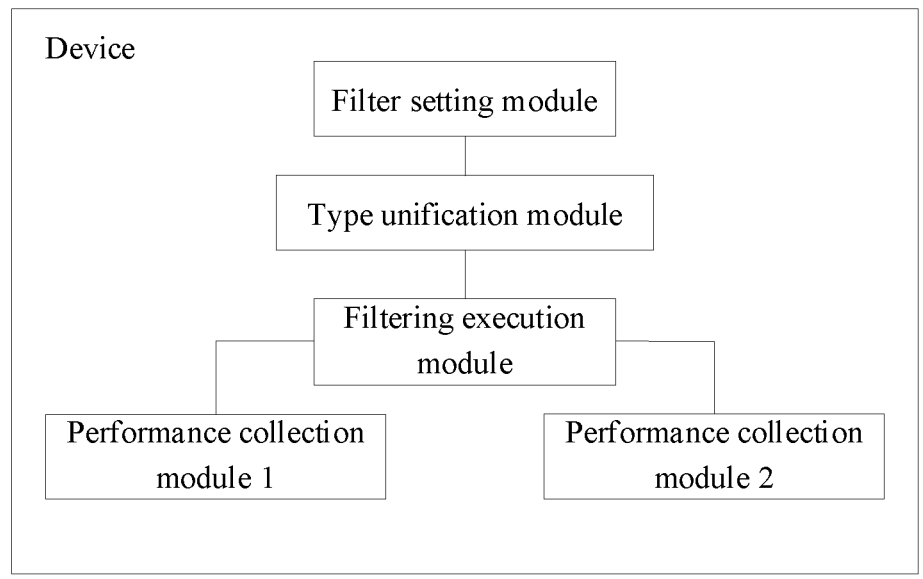
FIG. 5 is a schematic structural diagram of example two of a customizable filtering apparatus for a counter according to example embodiment V of the present disclosure.

As shown in FIG. 5, a difference between this example and example one is that the filter setting module and the type unification module are disposed at different positions. In this example, the filter setting module, the type unification module, the performance collection module and the filtering execution module are all disposed in the device.

Example Three

Figure 6:
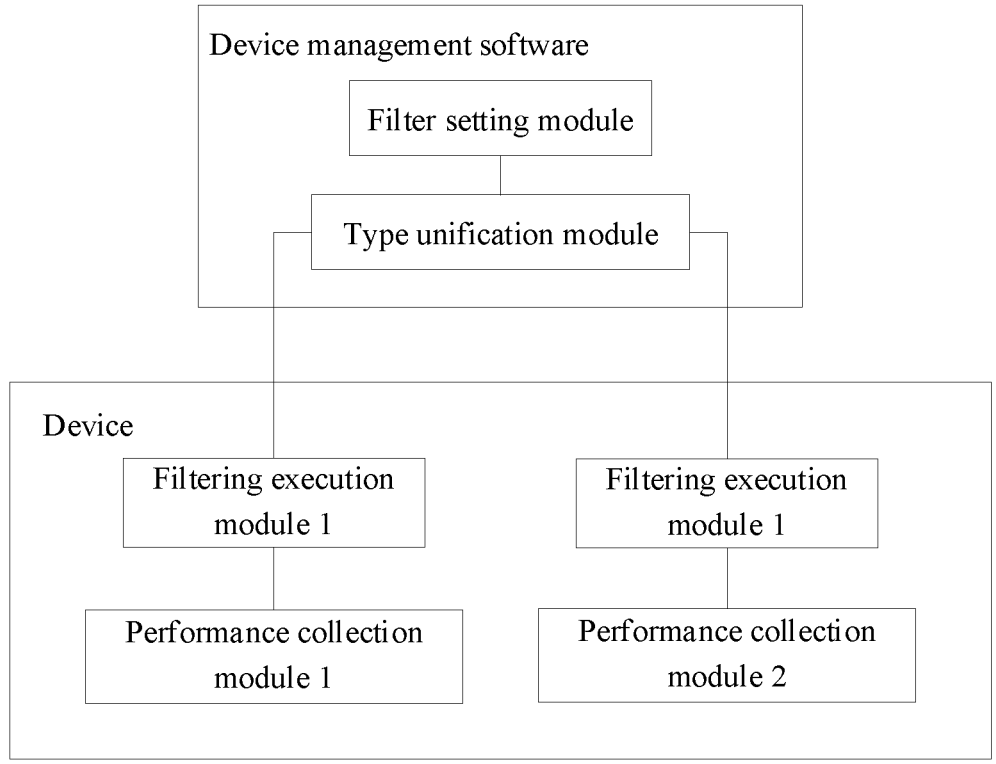
FIG. 6 is a schematic structural diagram of example three of a customizable filtering apparatus for a counter according to example embodiment V of the present disclosure.

As shown in FIG. 6, a difference between this example and example one is that the number and architectures of filtering execution modules are different. In this example, the number of filtering execution modules is at least two (only two filtering execution modules are shown in the figure). It should be noted that this architecture is a distributed architecture.

It should be understood that the device may adopt this distributed architecture due to division of physical components (for example, there are multiple boards) or logical functions (for example, a 5G base station is logically divided into three parts: CUCP, CUUP and DU).

Example Four

Figure 7:
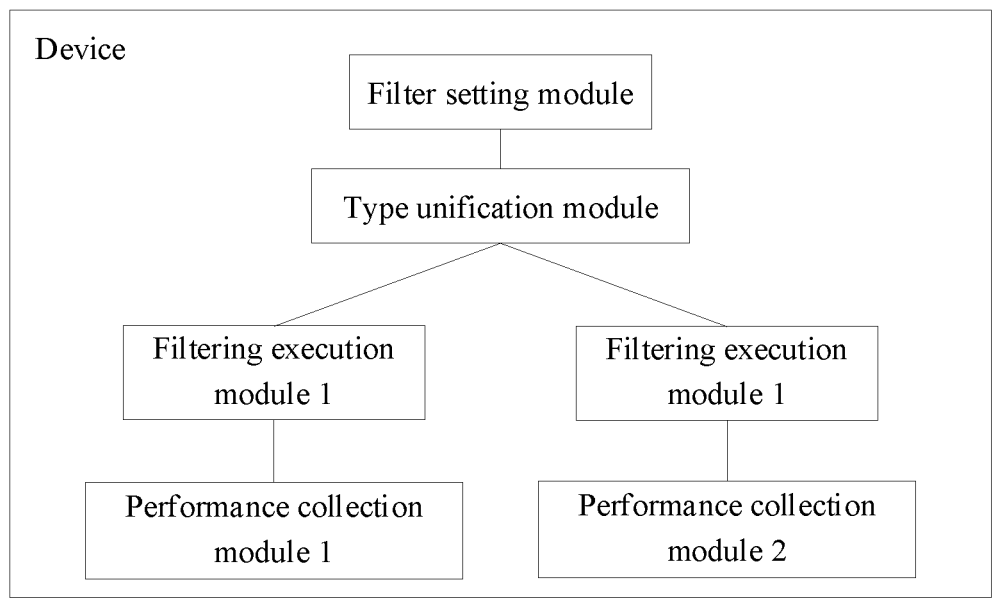
FIG. 7 is a schematic structural diagram of example four of a customizable filtering apparatus for a counter according to example embodiment V of the present disclosure.

As shown in FIG. 7, a difference between this example and example three is that the filter setting module and the type unification module are disposed at different positions. In this example, the filter setting module, the type unification module, the performance collection module and the filtering execution module are all disposed in the device.

The customizable filtering apparatus for a counter and the integral modules of the apparatus provided by the embodiment of the present disclosure can be implemented by a processor or a specific logic circuit, or by software or a combination of software and hardware. During implementation, the processor may be, but not limited to, a central processing unit (CPU), a microprocessor unit (MRU), a digital signal processor (DSP), a field programmable gate array (FPGA), or the like.

Example Embodiment VI

This embodiment further provides a non-transitory computer-readable storage medium that includes a volatile or non-volatile, removable or non-removable medium implemented in any method or technology for storing information, such as computer-readable instructions, data structures, computer program modules, or other data. The non-transitory computer-readable storage medium includes, but is not limited to, random access memory (RAM), read-only memory (ROM), electrically erasable programmable read-only memory (EEPROM), flash memory or other memory technologies, compact disc read-only memory (CD-ROM), digital versatile disc (DVD) or other optical disc storage, cassettes, magnetic tapes, magnetic disc storage or other magnetic storage devices, or any other media that can be configured to store desired information and can be accessed by computers.

The non-transitory computer-readable storage medium in the embodiment of the present disclosure can be used to store one or more computer programs, and the stored one or more computer programs can be executed by the processor to implement at least one step of the customizable filtering method for a counter in example embodiment I, example embodiment II, example embodiment III, and example embodiment IV described above.

The embodiments of the present disclosure have the following beneficial effects.

According to the customizable filtering method and apparatus for a counter, and the non-transitory computer-readable storage medium provided by the embodiments of the present disclosure, the first filter condition is configured according to the filter parameter table, where the first filter condition is configured with at least one type of first filter parameters. The first filter parameter is converted into the second filter parameter through type unification. The second filter parameter configured in the second filter condition is analyzed according to the filter parameter table, and the second filter parameter is converted and stored as the first data structure that is easy to filter locally. Performance data is collected, where the performance data includes the basic performance information and the filter indication information. The filter indication information is processed according to the filter parameter table, and stored into the second data structure. Filtering is performed, according to the first data structure, on the filter indication information stored in the second data structure, and a filtering result is recorded. In some implementations, customized setting of the filter conditions for the counter can be implemented, a filtering function is universal and can reduce the number of data types to be filtered, and filtering of filter parameters of multiple data types is supported.

It should be understood by those having ordinary skills in the art that all or some of the steps in the methods disclosed above, functional modules/units in the systems and devices disclosed above may be implemented as software (which may be implemented by computer program code executable by a computing device), firmware, hardware, and appropriate combinations thereof. In the hardware implementation, the division between functional modules/units mentioned in the above description does not necessarily correspond to the division of physical components; for example, a physical component may have multiple functions, or a function or step may be performed cooperatively by several physical components. Some or all of the physical components may be implemented as software executed by a processor, such as a central processing unit, a digital signal processor or a microprocessor, or as hardware, or as an integrated circuit, such as an application specific integrated circuit.

Furthermore, it is well known to those having ordinary skills in the art that communication media typically contain computer-readable instructions, data structures, computer program modules or other data in a modulated data signal such as a carrier wave or other transmission mechanism, and may include any information delivery media. Therefore, the present disclosure is not limited to any particular combination of hardware and software.

The foregoing is a detailed description of the embodiments of the present disclosure in conjunction with particular implementations, the implementations of the present disclosure should not be construed as being limited to the description. For those having ordinary skills in the art to which the present disclosure pertains, without departing from the concept of the present disclosure, several simple deductions or substitutions can be made, which should be regarded as falling within the scope of the present disclosure.

The invention claimed is:

1. A customizable filtering method for a counter, comprising:
    configuring a first filter condition according to a loaded filter parameter table, wherein the first filter condition is configured with at least one type of first filter parameters;
    converting the first filter parameter into a second filter parameter through type unification, and correspondingly, converting the first filter condition into a second filter condition;
    analyzing, according to the filter parameter table, the second filter parameter configured in the second filter condition, and converting and storing the second filter parameter as a first data structure that is easy to filter locally;
    collecting performance data, wherein the performance data comprises basic performance information and filter indication information;
    processing the filter indication information according to the filter parameter table, and storing the filter indication information into a second data structure; and
    performing filtering, according to the first data structure, on the filter indication information stored in the second data structure, and recording a filtering result;
    wherein when the filter condition combination comprises at least two sub-filter conditions, configuring a first filter condition according to a loaded filter parameter table further comprises:
        configuring a first filter condition according to logical operations between the sub-filter conditions and a processing order of the sub-filter conditions, wherein the logical operations between the sub-filter conditions comprise an OR operation;
    wherein performing filtering, according to the first data structure, on the filter indication information stored in the second data structure comprises:
        performing filtering on the filter parameters in the filter indication information according to the processing order;
        in response to the filter parameters meeting a current sub-filter condition and the operations between the current sub-filter condition and other sub-filter conditions are OR operation, determining that the filter parameters meet the first filter condition, and terminating the operations; and in response to the filter parameters meeting the current sub-filter condition and other sub-filter condition which connect the current sub-filter condition with an AND operation, determining that the filter parameters meet the first filter condition, and terminating the operations.

2. The customizable filtering method for a counter of claim 1, wherein configuring a first filter condition according to a loaded filter parameter table comprises:

setting a name of the filter condition combination, wherein the filter condition combination comprises at least one sub-filter condition;

selecting filter parameters;

setting ranges of the filter parameters; and whether the sub-filter condition comprises a NOT operation.

3. The customizable filtering method for a counter of claim 2, wherein performing filtering on the filter indication information stored in the second data structure according to the second filter condition in the first data structure comprises:

performing cyclic filtering on the filter indication information by adopting each sub-filter condition in the filter condition combination.

4. The customizable filtering method for a counter of claim 3, wherein performing cyclic filtering on the filter indication information by adopting each sub-filter condition in the filter condition combination comprises:

searching the filter indication information for the filter parameters according to type information of the second filter parameter in the sub-filter condition;

determining whether the filter parameters in the filter indication information have a filter parameter of a same type as the second filter parameter; and in response to the filter parameters in the filter indication information having a filter parameter of a same type as the second filter parameter, invoking a first range corresponding to the second filter parameter in the corresponding sub-filter condition according to a data type of the filter parameter in the filter indication information, and determining whether a second range of the filter parameters in the filter indication information is within the first range;

in response to the second range of the filter parameters in the filter indication information being within the first range, when the sub-filter condition comprises the NOT operation, performing the NOT operation on the sub-filter condition to complete filtering; and in response to the second range of the filter parameters in the filter indication information being not within the first range, determining that filtering fails.

5. The customizable filtering method for a counter of claim 1, wherein the filter parameters comprise name information, description information, a coded value, an original data type, a range, a unified target type, and a conversion indication.

6. The customizable filtering method for a counter of claim 5, wherein type unification performed on the filter parameter comprises:

determining whether the original data type is consistent with the unified target type;

in response to the original data type being consistent with the unified target type, skipping unification; and in response to the original data type being not consistent with the unified target type, converting the original data type into the unified target type according to the conversion indication.

7. The customizable filtering method for a counter of claim 1, wherein performing filtering on the filter indication information stored in the second data structure according to the second filter condition in the first data structure, and recording a filtering result comprises:

converting the filtering result into a form required for subsequent processing.

8. A non-transitory computer-readable storage medium storing at least one computer program executable by at least one processor to implement the customizable filtering method for a counter of claim 1.

9. A customizable filtering apparatus for a counter comprising:

a memory comprising:

a filter setting module, a type unification module, a filtering execution module, and a performance collection module, wherein the filter setting module is configured to: load a filter parameter table, send all or a part of content of the filter parameter table to the filtering execution module, and configure a first filter condition and send the first filter condition to the type unification module, wherein the first filter condition comprises at least one filter parameter;

the type unification module is configured to: convert the filter parameter into a second filter parameter through type unification, and correspondingly, convert the first filter condition into a second filter condition and send the second filter condition to the filtering execution module in a self-explanatory form;

the filtering execution module is configured to: load the received filter parameter table, analyze, according to the filter parameter table, the second filter parameter configured in the second filter condition, and convert and store the second filter parameter as a first data structure that is easy to filter locally;

the performance collection module is configured to collect performance data and send the performance data to the filtering execution module, wherein the performance data at least comprises basic performance information and filter indication information; and the filtering execution module is further configured to: process the filter indication information according to the filter parameter table, store the filter indication information into a second data structure, perform filtering on the second data structure according to the second filter condition in the first data structure, and send a filtering result and the received basic performance information to a subsequent processing module;

wherein when the filter condition combination comprises at least two sub-filter conditions, the filter setting module is further configured to:

configure a first filter condition according to logical operations between the sub-filter conditions and a processing order of the sub-filter conditions, wherein the logical operations between the sub-filter conditions comprise an OR operation; and the filtering execution module is further configured to:

perform filtering on the filter parameters in the filter indication information according to the processing order, in response to the filter parameters meeting a current sub-filter condition and the operations between the current sub-filter condition and other sub-filter conditions are OR operation, determine that the filter parameters meet the first filter condition, and terminate the operations, and in response to the filter parameters meeting the current sub-filter condition and other sub-filter condition which connect the current sub-filter condition with an AND operation, determine that the filter parameters meet the first filter condition, and terminate the operations.

* * * * *